Feb. 25, 1947.    W. A. SCHULZE ET AL    2,416,647
PROCESS FOR THE RECOVERY OF UNSATURATED HYDROCARBONS
Filed Feb. 9, 1943
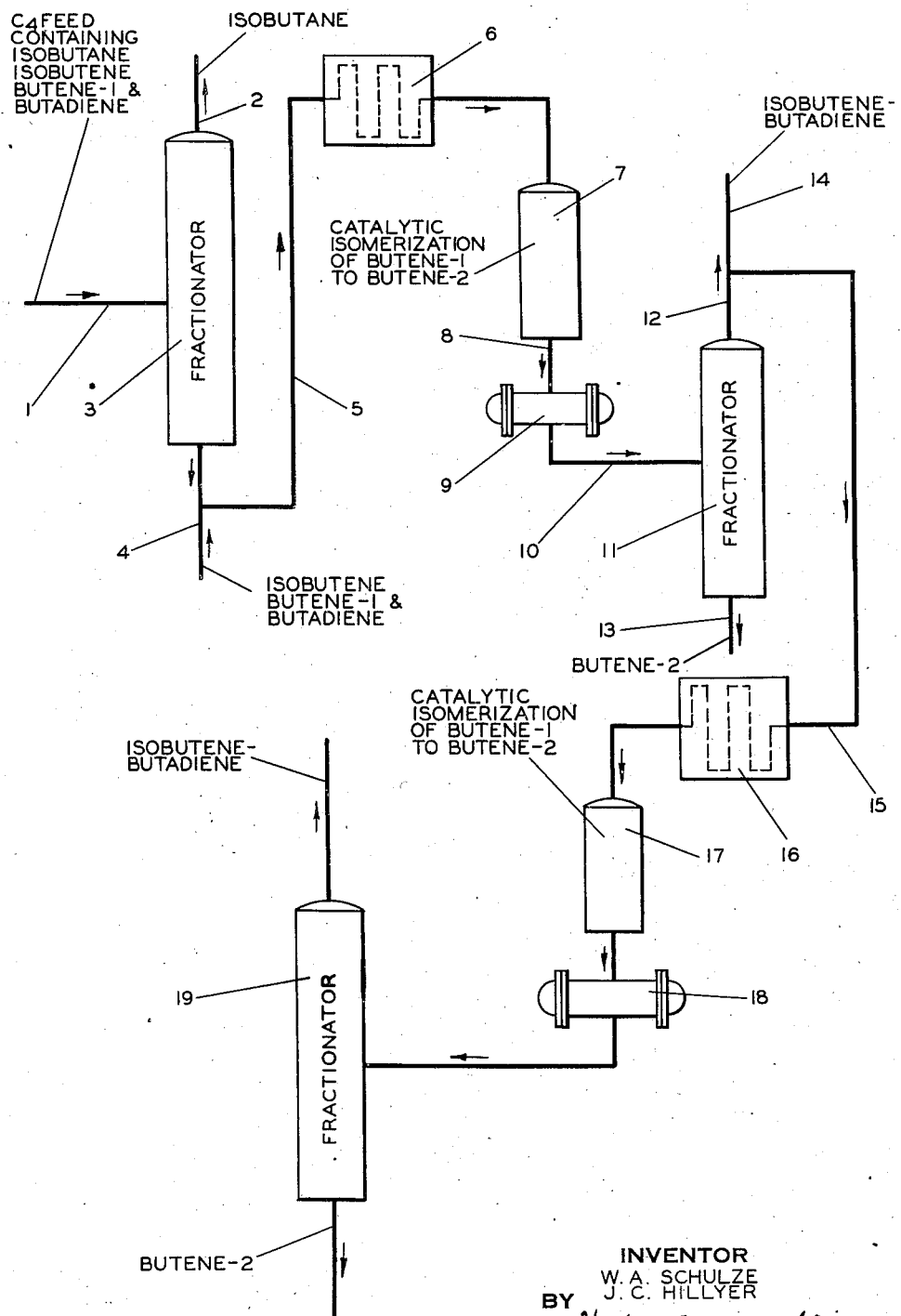
INVENTOR
W. A. SCHULZE
J. C. HILLYER
BY
Hudson, Young and Yinger
ATTORNEYS Patented Feb. 25, 1947

2,416,647

UNITED STATES PATENT OFFICE 2,416,647

PROCESS FOR THE RECOVERY OF UNSATURATED HYDROCARBONS

Walter A. Schulze and John C. Hillyer, Bartlesville, Okla., assignors to Phillips Petroleum Company, a corporation of Delaware Application February 9, 1943, Serial No. 475,268

9 Claims. (Cl. 260—683.2)

This invention is directed to a process for obtaining butadiene from hydrocarbons and relates further to a process for separating butadiene and isobutene from hydrocarbon mixtures containing the same. More particularly, this process is concerned with the separation of valuable, easily polymerizable butadiene-isobutene mixtures from gas mixtures containing same in admixture with butane and butenes.

It is among principal objects of this invention to provide a simple and effective method for the preparation, concentration, separation and recovery of butadiene-isobutene mixtures from gas mixtures in which these compounds are formed or contained along with butene-1 and other hydrocarbons whose physical and chemical properties ordinarily render such separation difficult and complex. Further objects and advantages of the present invention will be readily apparent from a consideration of the factors discussed hereinbelow.

In our copending application, Serial No. 369,490, filed December 10, 1940 (now Patent Number 2,386,983, granted October 16, 1945), of which the present application is a continuation-in-part, we have disclosed an improved method of separating butadiene from hydrocarbon mixtures, particularly those containing mono-olefinic $C_4$ hydrocarbons. One of the steps in the process therein disclosed comprises isobutene removal either before or after segregation of a concentrated butadiene fraction. Said butadiene and isobutene-containing mixtures are normally present in $C_4$ hydrocarbon fractions produced by thermal or catalytic treatment of normally gaseous hydrocarbons or of heavier liquid petroleum fractions, and, especially in the latter instance, often contain large concentrations of isobutene.

A $C_4$ hydrocarbon fraction of the type described may be readily isolated from higher and lower boiling fractions in substantially pure form by fractional distillation. Further separation of this complex fraction by distillation, however, has been difficult since the boiling points of all the components of this fraction are distributed over a relatively narrow range, as indicated below:

| Compound | Boiling point, ° F. (760 mm. pressure) |
|---|---|
| Isobutane | 10 |
| Butene-1 | 20 |
| Isobutene | 21 |
| Butadiene | 23 |
| n-Butane | 31 |
| Trans butene-2 | 33 |
| Cis butene-2 | 39 |

With efficient fractionating equipment it is possible to effect satisfactory separations between certain of the $C_4$ hydrocarbons of the above-mentioned mixture. In such equipment, while it is possible to separate isobutane on the lower boiling side and n-butane and the isomers of butene-2 on the higher boiling side, the separation of butene-1, isobutene and butadiene into substantially pure components is almost impossible. As noted above, these three compounds boil within 3° F. Similarly, the separation of isobutene-butadiene stocks from such mixtures also containing butene-1 is extremely difficult.

We have now found that butadiene-isobutene concentrate may be separated from a $C_4$ hydrocarbon mixture containing these components along with normal butene comprising at least butene-1 and $C_4$ paraffins by a process comprising the proper selection and/or sequence of the steps of (1) removing isobutane by fractionation, (2) isomerizing butene-1 to butene-2, (3) fractional distillation to give a butadiene-isobutene concentrate.

We have found that when butene-1 is absent or is reduced to very low concentrations, it is possible to prepare by simple fractional distillation a product consisting essentially of butadiene and isobutene with smaller amounts of contaminants than has heretofore been possible except by the usually impracticable method of blending the substantially pure components. If compounds, which cannot be separated by fractionation, remain in the butadiene-isobutene mixture in minor quantities after the first two steps, the final concentrations of butadiene and isobutene attained is related inversely to the quantity of these other hydrocarbons remaining.

We have also found that the conversion of butene-1 to butene-2 which is readily accomplished by means of catalytic isomerization at low temperature offers a means whereby nearly all the normal butenes may readily be recovered by fractionation in the form of a butene-2 concentrate without excessive loss or contamination.

The process according to our invention may be more readily understood by referring to the accompanying drawing which represents schematically one type of apparatus in which our process can be used.

In the drawing, a $C_4$ hydrocarbon fraction containing butene-1, isobutene and butadiene, such as that derived from cracking still vapors, dehydrogenation of normal butane or butenes or similar processes, enters the system via line 1 if it contains isobutane which is removed via line 2 in fractionator 3, or via line 4 if it is free from isobutane, and passes via line 5 and preheater 6 into catalyst case 7 in which isomerization of butene-1 to butene-2 is carried out. The isomerization effluent passes via line 8 to condenser 9 from which the liquid is passed via line 10 to fractionating unit 11 whereby the application of suitable heat and pressure, the overhead passing through line 12 consists of butadiene-isobutene and small portions of unconverted butene-1 while the bottoms fraction leaving via line 13 contains principally butenes-2, together with normal butane, where that component was present in the incoming feed.

The overhead from column 11 may be withdrawn via line 14. If desired, it may be given a second isomerization treatment by passage via line 15 and heater 16 to a second catalytic isomerization converter 17 where the butene-1 is converted to butene-2. The vaporous effluent from converter 17 passes to condenser 18 from which the liquid condensate is fed to a second fractionator 19 from which an overhead of butadiene-isobutene and a bottoms of butene-2 are withdrawn.

In one specific embodiment of the invention, the $C_4$ fraction containing butenes, butadiene and isobutene is de-isobutanized, and passed in the vapor form over a catalyst of an acidic nature, such as dilute phosphoric acid supported on an inert carrier such as silica gel, at a temperature in the range of 200° to 600° F. and at flow rates equivalent to 0.5 to 5 liquid volumes per hour per volume of catalyst, to isomerize butene-1 to butene-2. The vapors are cooled, condensed and then subjected to fractional distillation in which an overhead fraction of butadiene and isobutene and a bottom fraction comprising butene-2 isomers is obtained.

The isomerization reaction is based on the fact that butene-1 exists in equilibrium with butenes-2, and that the relative amounts of the isomers present varies with the temperature. We have found that low temperatures favor the butene-2 isomers as against butene-1, and that in processes for carrying out the isomerization of butene-1 temperatures should be kept as low as practicable and a catalyst should be employed to obtain rapid reaction. The selection of an operating temperature is dependent, of course, on additional factors, particularly the activity of the catalyst and the extent of undesirable side reactions occurring. We have found that even in the presence of catalysts, reaction proceeds slowly below 100° F. and temperatures of 150° to 600° F. or even higher are desirable. In the isomerization step, splitting and coking reactions are unimportant at temperatures within this range, and polymerization of the olefins to form octenes or the like may be effectively suppressed by suitable control of catalyst composition and treating conditions.

As catalysts for our isomerization step we prefer to employ catalysts which are highly active so that lower isomerization temperatures may be employed. Acidic salts such as aluminum phosphate and the like may be used. Even more active, however, are solutions of sulfuric or phosphoric acids adsorbed on suitable carriers whereby the acid strength is maintained at values below the range which would cause polymerization of the butadiene. Also preferred are catalysts comprising magnesia, particularly brucite, which are activated by substantially complete dehydration prior to use and are employed with dehydrated feed stocks.

It is not to be understood from the foregoing description of one specific method of carrying out the isomerization of butene-1 to butene-2 that the application of the invention is limited thereto. This invention contemplates the use of catalytic isomerization as the first step in a process of concentrating butadiene-isobutene mixtures. The means whereby this substantially complete isomerization of butene-1 is carried out to butene-2 may be selected at will from a variety of methods, using one of the many different catalysts known to the art.

Following the steps of isomerization of butene-1, the $C_4$ mixture comprises essentially butadiene-isobutene, n-butane and the isomers of butene-2. This fraction is well adapted to fractional distillation for segregation of butadiene and isobutene since the boiling point of the butadiene differs by 8° F. or more from the boiling points of the other hydrocarbons present.

The butadiene-isobutene stream removed is highly concentrated, the exact composition depending on the initial concentrations of the desired components and the completeness with which butene-1 was removed prior to fractionation. In general, from predominantly unsaturated gases containing initially more than ten per cent of butadiene and isobutene, concentrates of 90 per cent and above may be obtained. From gases containing initially a greater quantity of butadiene and/or isobutene, such as those obtained from gas cracking, having 30 to 50 per cent butadiene and isobutene and negligible amounts of n-butane, concentrates of 95 per cent or even higher are obtained.

This process may very conveniently be applied to the process of catalytically cracking hydrocarbon liquids to produce light unsaturated gases. Indeed, it may be integrated into such a process as a most convenient and economical step requiring only a bare minimum of equipment. Since the cracking step is ordinarily carried out at high temperatures of 1000° to 1300° F., and the effluents are then immediately cooled and subjected to fractionation, catalyst chambers for the isomerization step operating in the range of 200° to 600° F. may be inserted by merely dividing the aforesaid cooling into two stages. Isobutene is often present in relatively large quantity in the $C_4$ fractions from cracking processes, and may often exceed the butadiene concentration. In some cases the isomerization treatment may be performed after an initial fractionation to separate butene-2 and/or n-butane.

Many modifications of our process are possible, depending on the particular hydrocarbon mixture undergoing treatment and the most efficient combination or sequence of the steps of said process. Thus when isobutane is substantially absent from a mixture, the de-isobutanizing step may be omitted, and isomerization alone followed by fractionation will produce a high-purity butadiene-isobutene concentrate. Also successive treatments of the butadiene-isobutene fraction by our process or by any individual steps thereof to increase the purity of the concentrate may be desirable. For example, a fraction consisting of butene-1, isobutene and butadiene and produced by our process may be given a second isomerization treatment and refractionated to remove the major portion of the normal monoolefins. These and other modifications of our process will be obvious to those skilled in the art and thus are within the scope of our invention.

The butadiene-isobutene concentrate prepared in accordance with the process of the present invention may be particularly suited as a charge for polymerization to that form of synthetic rubber known as butyl rubber. However, it may be put to any other use within the skill of those versed in the art and the invention, therefore, is by no means limited to preparation of a butyl rubber feed.

The following example will still further illustrate specific applications of the process of the present invention, and is not to be construed as limitations thereof.

Example

In a catalytic cracking operation a light distillate is cracked at 1100° F. and 30 pounds gage pressure to yield about 80 per cent of gasoline and 20 weight per cent of $C_4$ and lighter hydrocarbons. The $C_4$ fraction contains butadiene, mixed butylenes and butane in the following quantities.

| Component | Weight per cent |
|---|---|
| Butadiene | 12.3 |
| Isobutene | 25.4 |
| Butene-1 | 19.1 |
| Butene-2 | 32.2 |
| n-Butane | 11.0 |

Isomerization of this fraction at 250° F. over 50 per cent phosphoric acid supported on silica gel converts butene-1 to butene-2 with the effluent having the following approximate composition:

| Component | Weight per cent |
|---|---|
| Butadiene | 12.5 |
| Isobutene | 24.0 |
| Butene-1 | 4.2 |
| Butene-2 | 47.9 |
| n-Butane | 11.4 |

Fractionation of the isomerized $C_4$ mixture produces an overhead fraction containing substantially all of the butadiene and isobutylene with only a minor quantity of other olefins.

Further concentration of the butadiene-isobutene stock by separation of butene-1 is obtained by a second isomerization treatment over a catalyst of low polymerizing activity followed by fractionation to remove the butene-2 formed in isomerization.

In the foregoing specification and in the claims, the butene-2 referred to ordinarily describes either or both butene-2 isomers in proportions which depend on the material being treated and the conditions under which said isomers are formed. For purposes of convenience, therefore, the term "butene-2" will describe a portion containing either or both of said isomeric forms.

While we have described our invention in a detailed manner and provided specific examples illustrating suitable modes of executing the same, no limitations are thereby implied other than those imposed by the appended claims.

We claim:

1. A process for the separation of a butadiene-isobutene concentrate from a $C_4$ hydrocarbon mixture comprising n-butane, butadiene, isobutane, butene-1 and isobutene, which comprises fractionating said mixture to remove isobutane, contacting the de-isobutanized mixture with an olefin isomerization catalyst under suitable conditions and thereby converting butene-1 to butene-2, and subjecting the isomerized mixture to fractional distillation to produce an overhead fraction comprising butadiene and isobutene and a bottoms fraction comprising n-butane and butene-2.

2. A process for the separation of a butadiene-isobutene concentrate from a $C_4$ hydrocarbon mixture comprising n-butane, isobutane, butadiene, butene-1 and isobutene, which comprises fractionating said mixture to remove isobutane, contacting the de-isobutanized mixture with an olefin isomerization catalyst and thereby converting butene-1 to butene-2, and fractionally distilling the resulting mixture to produce an overhead fraction comprising butadiene-isobutene and a bottoms fraction comprising n-butane and butene-2.

3. A process for the separation of a butadiene-isobutene concentrate from a $C_4$ hydrocarbon mixture containing n-butane, butadiene, isobutene, and butene-1 which comprises contacting said mixture with an olefin isomerization catalyst and thereby converting butene-1 to butene-2, and fractionally distilling the resulting mixture to produce an overhead fraction comprising butadiene-isobutene and a bottoms fraction comprising n-butane and butene-2.

4. A process for the separation of a butadiene-isobutene concentrate from a $C_4$ hydrocarbon mixture containing n-butane, butene-1, isobutene and butadiene which comprises contacting said mixture with an olefin isomerization catalyst under conditions effecting conversion of a substantial proportion of the butene-1 to butene-2, fractionally distilling the resulting mixture to produce an overhead fraction comprising butadiene, isobutene and the unconverted butene-1 and a bottoms fraction comprising n-butane and butene-2, treating said overhead fraction in a second catalytic isomerization stage under conditions effecting conversion of a further and substantial amount of butene-1 to butene-2, and finally fractionally distilling the effluents of the second isomerization step to produce an overhead fraction substantially comprising a butadiene-isobutene mixture and a bottoms fraction comprising butene-2.

5. In the process of producing butadiene by the catalytic dehydrogenation of n-butenes, the method of separating a butadiene-isobutene concentrate from the $C_4$ hydrocarbon mixture comprising butene-1, butadiene, and isobutene resulting from said dehydrogenation which comprises the steps of catalytically isomerizing said mixture under conditions effecting conversion of butene-1 to butene-2, and subjecting the resulting mixture to fractional distillation to produce an overhead fraction comprising butadiene-isobutene and a bottoms fraction comprising butene-2.

6. A process for the separation of a butadiene-isobutene concentrate from a $C_4$ hydrocarbon mixture comprising n-butane, butadiene, isobutane, butene-1, and isobutene which comprises fractionating said mixture to remove isobutane, isomerizing a substantial proportion of the butene-1 to butene-2, subjecting the mixture to fractional distillation to produce an overhead fraction comprising butadiene, isobutene and unconverted butene-1 and a bottoms fraction comprising n-butane and butene-2, treating said overhead fraction in a second isomerization stage under conditions effecting conversion of a further and substantial proportion of the butene-1 to butene-2 and finally fractionally distilling the effluents of the second isomerization step to produce an overhead fraction substantially comprising a butadiene-isobutene mixture and a bottoms fraction comprising butene-2.

7. A process for the separation of a butadiene-isobutene concentrate from a $C_4$ hydrocarbon mixture comprising n-butane, butadiene, butene-1, and isobutene, which comprises isomerizing a substantial proportion of the butene-1 to butene-2, subjecting the mixture to fractional distillation to produce an overhead fraction comprising butadiene, isobutene and unconverted butene-1 and a bottoms fraction comprising n-butane and butene-2, treating said overhead fraction in a second isomerization stage under conditions effecting conversion of a further and substantial proportion of the butene-1 to butene-2 and finally fractionally distilling the effluents of the second isomerization step to produce an overhead fraction substantially comprising butadiene and isobutene and a bottoms fraction comprising butene-2.

8. A process for the separation of a butadiene-isobutene concentrate from a $C_4$ hydrocarbon mixture also containing butene-1 which comprises subjecting said feed to catalytic isomerization under conditions effecting conversion of said butene-1 to butene-2 without appreciably affecting the butadiene and isobutene content of the feed, and fractionally distilling the isomerized mixture to produce an overhead fraction containing butadiene and isobutene and a bottoms fraction containing butene-2.

9. The process of separation of butadiene and isobutene from admixture with butene-1 which comprises catalytically isomerizing the butene-1 in said mixture to butene-2, and fractionally distilling the isomerized mixture to separate the butadiene and isobutene in an overhead fraction.

WALTER A. SCHULZE.
JOHN C. HILLYER.

REFERENCES CITED

The following references are of record in the file of this patent:

UNITED STATES PATENTS

| Number | Name | Date |
|---|---|---|
| 2,298,931 | Drennan | Oct. 13, 1942 |
| 2,220,693 | Van Peski et al. | Nov. 5, 1940 |
| 2,299,716 | Van Peski | Oct. 20, 1942 |
| 2,330,115 | Drennan | Sept. 21, 1943 |